United States Patent
Dross

(10) Patent No.: US 11,835,731 B2
(45) Date of Patent: Dec. 5, 2023

(54) OPTICAL COLLIMATOR

(71) Applicant: LEDLENSER GMBH & CO. KG, Solingen (DE)

(72) Inventor: Oliver Dross, Hilden (DE)

(73) Assignee: LEDLENSER GMBH & CO. KG, Solingen (DE)

( * ) Notice: Subject to any disclaimer, the term of this patent is extended or adjusted under 35 U.S.C. 154(b) by 244 days.

(21) Appl. No.: 17/260,357

(22) PCT Filed: Jun. 18, 2019

(86) PCT No.: PCT/DE2019/100555
§ 371 (c)(1),
(2) Date: Jan. 14, 2021

(87) PCT Pub. No.: WO2020/025079
PCT Pub. Date: Feb. 6, 2020

(65) Prior Publication Data
US 2021/0271101 A1 Sep. 2, 2021

(30) Foreign Application Priority Data
Aug. 1, 2018 (DE) ..................... 10 2018 118 684.3

(51) Int. Cl.
*G02B 27/30* (2006.01)
*G02B 3/00* (2006.01)
*G02B 19/00* (2006.01)

(52) U.S. Cl.
CPC ........... *G02B 27/30* (2013.01); *G02B 3/0043* (2013.01); *G02B 3/0056* (2013.01); *G02B 19/0028* (2013.01); *G02B 19/0047* (2013.01)

(58) Field of Classification Search
CPC .... G02B 27/30; G02B 3/0043; G02B 3/0056; G02B 3/0037; G02B 19/0028; G02B 19/0047
See application file for complete search history.

(56) References Cited

U.S. PATENT DOCUMENTS 7,938,559 B2    5/2011  Angelini et al.
2004/0095550 A1*  5/2004  Tai ..................... G02F 1/13362
                                                            349/194

(Continued)

FOREIGN PATENT DOCUMENTS

DE           100 51 464 A1    5/2002
DE      60 2004 004078 T2    8/2007

(Continued)

OTHER PUBLICATIONS

International Search Report and Written Opinion for Application No. PCT/DE2019/100555 dated Oct. 28, 2019.

(Continued)

*Primary Examiner* — Ryan D Howard
(74) *Attorney, Agent, or Firm* — ALSTON & BIRD LLP

(57) ABSTRACT

The invention relates to an optical collimator for focusing light by means of a plurality of optical surfaces, which are designed as light entry surfaces and/or light exit surfaces and/or reflection surfaces, which form respective optical boundary surfaces with a change in the optical density. The aim of the invention is to propose a collimator by means of which homogeneous illumination is possible even if a plurality of light sources is used, the collimator having a compact design and being economical to produce. This aim is achieved, according to the invention, in that the collimator has a plurality of concave micro-lenses (3, 11), which are formed on at least one of the optical surfaces.

21 Claims, 5 Drawing Sheets

(56) References Cited

U.S. PATENT DOCUMENTS

2013/0058103 A1    3/2013   Jiang et al.
2016/0195243 A1*   7/2016   Dross .................... F21V 7/048
                                                                             362/297
2017/0138546 A1*   5/2017   Wang ................... F21V 7/0091

FOREIGN PATENT DOCUMENTS

DE      10 2011 012130 A1    8/2012
WO    WO 2008/021082 A2    2/2008
WO    WO 2015/197731 A1   12/2015

OTHER PUBLICATIONS

Office Action for European Patent Application No. 19753238.5 dated Aug. 11, 2003 (6 pages).

* cited by examiner

OPTICAL COLLIMATOR

CROSS-REFERENCE TO RELATED APPLICATIONS

This application is a National Stage Entry of PCT Application Serial No. PCT/DE2019/100555, filed on Aug. 1, 2018, the contents of which are herein incorporated by reference in their entirety.

TECHNOLOGICAL FIELD

The present invention relates to an optical collimator for focusing light by means of a plurality of optical surfaces, which are designed as light entry surfaces and/or light exit surfaces and/or reflection surfaces, each forming optical interfaces with a change in the optical density.

BACKGROUND

Collimators of this type are known from the prior art and are used for bundling light that is emitted by light sources, allowing the illumination to be adapted to individual requirements. In flashlights and headlamps in particular, such collimators are used for focusing the emitted light cone.

To generate high luminous fluxes, a plurality of light sources arranged close together are often used, such as e.g. four LEDs or LED chips arranged in a square in an LED casing. In this case, however, no homogeneous light source is present, resulting in inhomogeneous illumination, particularly in combination with a comparatively small collimator. In illumination optics, homogeneous illumination is understood to mean a uniform distribution of the illuminance on a test surface that is illuminated by the illumination device. Artefacts in the case of inhomogeneous illumination, such as e.g. square, punctiform or cross-shaped light-dark contrasts, are not visible to the human eye in the case of homogeneous illumination.

To avoid these artefacts, diffusers or scattering lenses are known, which possess a large number of small scattering centers and which are arranged on the side of the collimator facing away from the light sources. These additional diffusers are disadvantageous, however, because they create additional costs in manufacture and assembly and because they take up additional space, the availability of which is limited in small and convenient flashlights and headlamps.

Furthermore, it is known to form the light exit surfaces of a collimator as a diffuser. To this end, part of the light exit surface or the entire light exit surface of the collimator is matted. This disadvantageously leads to a certain backscattering of the light, thus reducing efficiency. Moreover, diffuse structures are difficult to specify and to manufacture reproducibly, since non-deterministic processes, such as erosion or etching, are often used for this purpose.

Finally, it is known to arrange convex micro lenses on the light exit surface of a collimator, which can lead to inhomogeneities in light distribution particularly in zoom lenses, in which the distance between collimator and light source varies. The inhomogeneities arise because the micro lenses have a focal plane which, for certain settings of the collimator, is arranged close to the light source, resulting in the projection of multiple images of the light source to the far field. The multiple images generate a short-wave intensity modulation, which can be perceived by the human eye even at small amplitudes. In such a case, grid-like light-dark contrasts can generally be seen on a test surface.

BRIEF SUMMARY

It is true that this problem can be at least partially overcome by reducing the size of the micro lenses, because this maintains the light-scattering effect but decreases the focal length of the micro lenses. However, the production of such small micro lenses is relatively complex and the requirements for the mold for producing the micro lenses are exacting.

From this starting point, it is the object of the present invention to overcome the disadvantages of the prior art, at least partially. In particular, a collimator should be proposed with which homogeneous illumination is possible even when using a plurality of light sources. This collimator should have a compact design and should be economical to produce.

This object is achieved by the collimator according to claim 1, according to which it is provided according to the invention that the collimator has a plurality of concave micro lenses, which are formed on at least one of the optical surfaces.

The focal planes of concave micro lenses, which can be projected to the far field, are virtual, unlike the focal planes of convex micro lenses, and are located on the side facing away from the light source. As a result, artefacts due to multiple images are prevented while the scattering properties of the micro lenses are otherwise maintained.

Preferred embodiments of the present invention will be described below as well as in the subclaims.

According to a first preferred embodiment, the collimator is configured as a so-called TIR collimator (Total Internal Reflection collimator). The TIR collimator possesses a central converging lens having a rearward-facing light entry surface and a forward-facing light exit surface. The rearward-facing light entry surface can be of flat, concave or convex configuration. Furthermore, the TIR collimator possesses a reflector part, possessing a light entry surface, a TIR reflector surface and a light exit surface, the reflector part surrounding the central converging lens in such a way that the collimator possesses a rearward-facing cavity that is delimited by the light entry surface of the converging lens and the light entry surface of the reflector part. The concave micro lenses of such a TIR collimator are preferably formed on the light entry surface of the converging lens, the light exit surface of the converging lens, the light entry surface of the reflector part, the TIR reflector surface and/or the light exit surface of the reflector part. Because the converging lens causes the majority of the artefacts at issue, it is already sufficient in most applications if the light entry surface or light exit surface of the converging lens has concave micro lenses. In addition, the remaining optical surfaces in any combination can likewise possess concave micro lenses.

According to a preferred embodiment of the present invention, it is provided that convex micro lenses are formed on at least one optical surface without concave micro lenses. It is preferably provided in this case that concave micro lenses are formed on the light entry surface of the converging lens and convex micro lenses are formed on the TIR reflector surface. In this embodiment in particular the light entry surface of the converging lens can be concave in form, with a radius of curvature being provided which is significantly larger than the radius of curvature of the convex light exit surface of the converging lens.

So that the concave micro lenses can be produced by simple means and economically, they are substantially circular in form or possess polygonal perimeters and preferably have an average diameter of 0.4 mm to 3 mm. With the preferred arrangement of uniform micro lenses, this results in a micro lens density of 9 to 625 micro lenses/cm². Depending on the application, however, it is also provided that micro lenses with different diameters can be arranged, which can have a positive effect on the scattering properties of the collimator.

The micro lenses can be spherical or aspherical in form, with spherical micro lenses having a radius of curvature R of preferably 0.3 mm to 20 mm. It is provided in this case that the depth T of the micro lenses varies between 0.05 mm and 1 mm.

Besides the arrangement of non-uniformly sized micro lenses, a uniform or non-uniform distribution of the concave and convex micro lenses on the optical surfaces of the collimator is also provided. In addition, a distribution of micro lenses with variable optical design is also provided, such as e.g. micro lenses with various radii of curvature, different average radii or aspherical micro lenses. Likewise, an arrangement of the micro lenses with partial or total surface coverage is provided.

The collimators with concave micro lenses as described above are preferably produced by an injection-molding method, to which end convex structures corresponding to the micro lenses are present in the injection-molding tool, which can be introduced directly using diamond turning, high-speed milling or comparable machining methods. However, fillets are formed at the edges of the micro lenses in the process, the size of which depends on the radius of the tool employed and other production parameters. Provided that the fillets are small enough, the optical function of the micro lenses is not significantly impaired thereby.

Alternatively, a negative of the tool can be produced in which the structures corresponding to the micro lenses are formed in a concave manner, whereby they are readily accessible to machining tools. In a second step a tool can be replicated from this, e.g. by galvanic growth of a sufficiently thick layer of nickel, which is then separated from the negative and post-processed. In the tool, the shaping structures are then convex and, when replicated with the dielectric, collimators with concave micro lenses are obtained with no fillets occurring on the edges thereof.

DESCRIPTION OF THE DRAWINGS

Specific embodiments of the present invention will be explained below with reference to the figures. These show the following.

DETAILED DESCRIPTION

Figure 1:
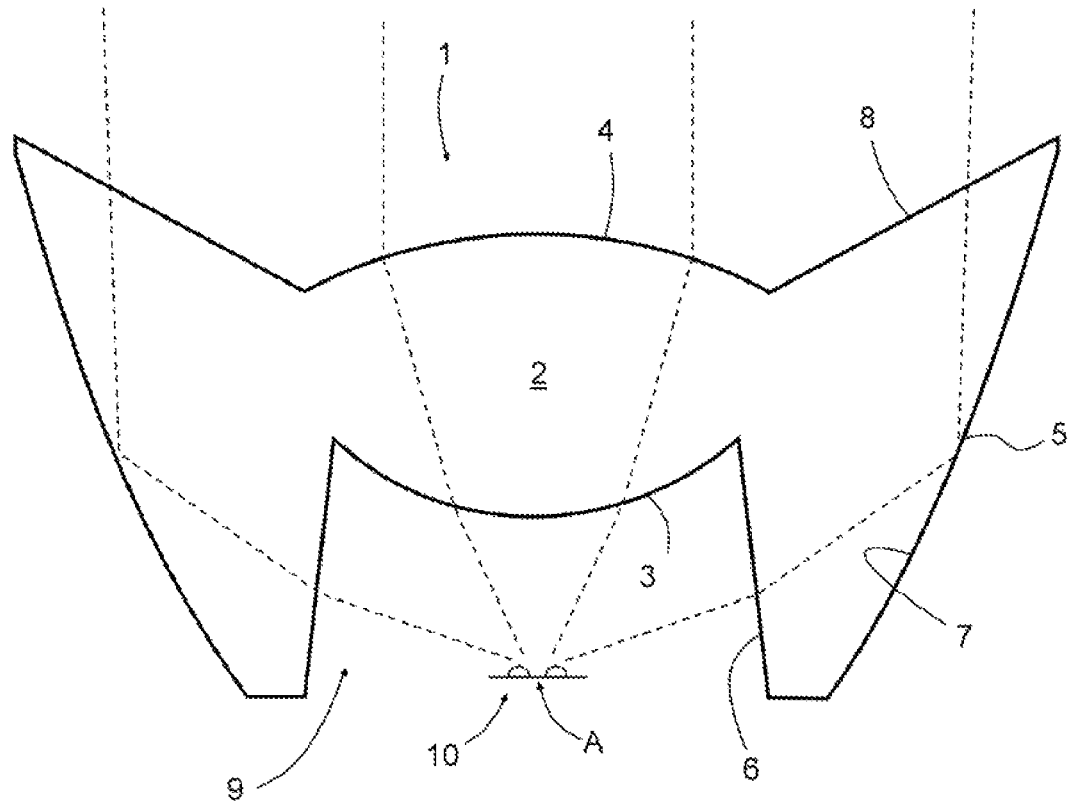
FIG. 1: a cross-sectional illustration of a TIR collimator according to the prior

FIG. 1 shows a TIR collimator 1, as known according to the prior art. These TIR collimators 1 possess a central converging lens 2, which is defined by a rear light entry surface 3 and a front light exit surface 4. The central converging lens 2 is surrounded by a reflector part 5 having light entry surfaces 6 and TIR reflector surfaces 7 at the sides and light exit surfaces 8 at the front. The reflector part 5 here surrounds the central converging lens 2 in such a way that the TIR collimator 1 possesses a rearward-facing cavity 9, which is delimited by the light entry surface 6 of the reflector part 5 and by the light entry surface 3 of the central converging lens 2. In the assembled state of such a TIR collimator 1, the light source 10 is located inside or below the cavity 9, such that the emitted light of the LED enters the TIR collimator 1 completely or at least for the most part. The light is either bundled inside the TIR collimator 1 in the central converging lens 2 or totally internally reflected on the TIR reflector surface 7 of the reflector part 5. To increase the luminous flux, it is conventional to use a plurality of light sources 10, between which a slight spacing A is arranged. As a result, a homogeneous light source 10 is no longer present and the emitted light has inhomogeneities in the form of light-dark contrasts.

Figure 2A:
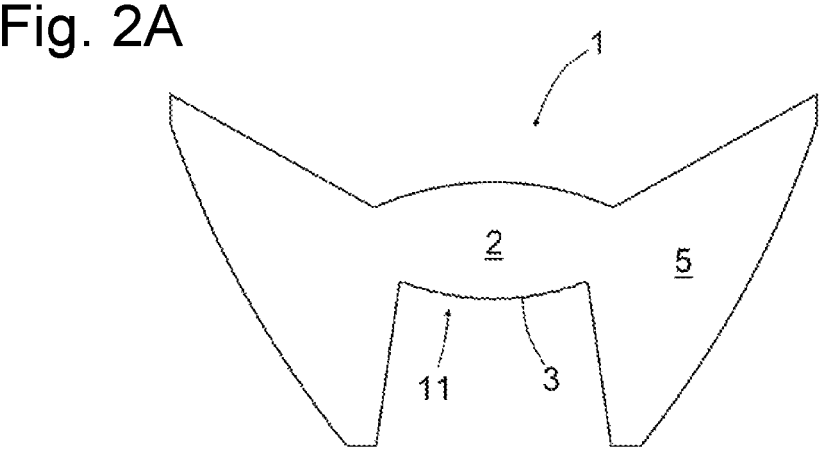
FIGS. 2A-2F: multiple cross-sectional illustrations of a collimator according to the invention.
Figure 2B:
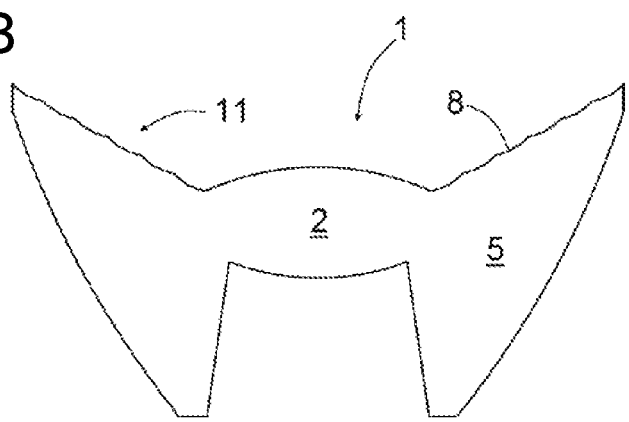
Figure 2C:
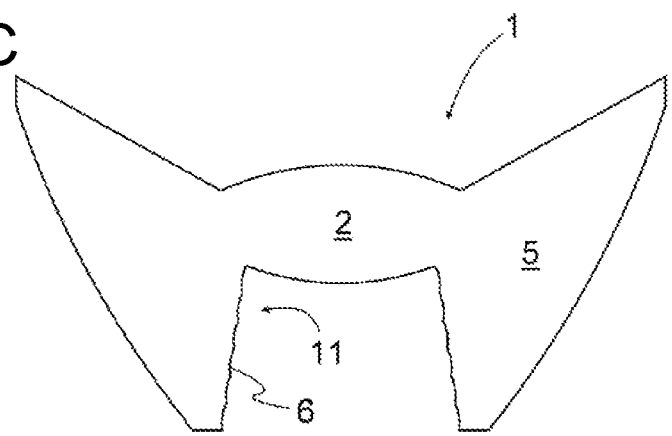
Figure 2D:
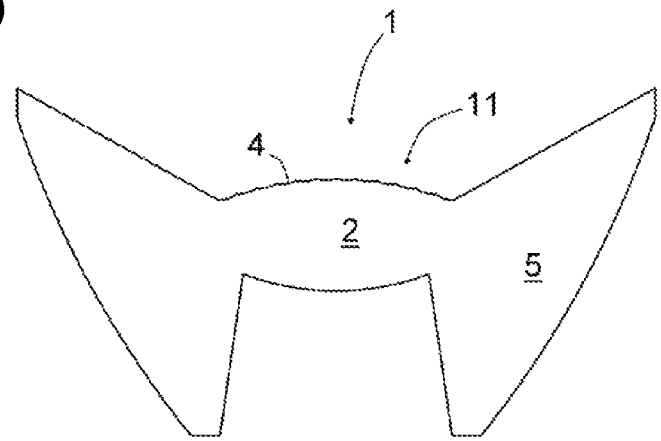

To remedy these inhomogeneities, it is provided according to a specific embodiment of the present invention to arrange concave micro lenses 11 on the light entry surface 3 of the central converging lens 2. This prevents multiple images and avoids the aforementioned inhomogeneities. FIG. 2A shows such a TIR collimator 1, in which concave micro lenses 11 are arranged on the light entry surface 3 of the central converging lens 2.

Figure 2E:
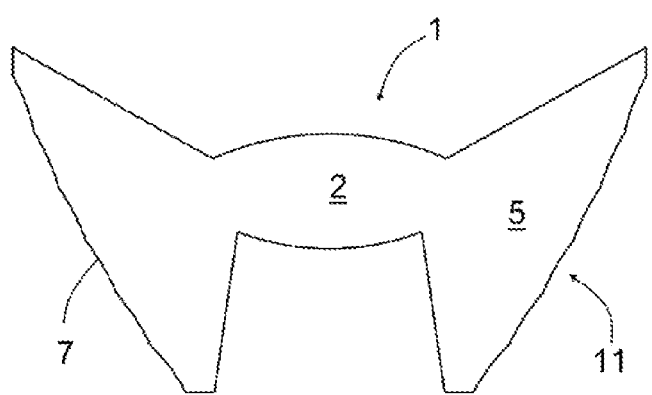

FIGS. 2B-2F show alternative embodiments in which other optical surfaces of the TIR collimator 1 are provided with concave micro lenses 11. Specifically, the micro lenses 11 are formed on the light exit surface 8 of the reflector 5 (FIG. 2B), the light entry surface 6 of the reflector part 5 (FIG. 2C), the light exit surface 4 of the converging lens 2 (FIG. 2D) and/or the TIR reflector surface 7 (FIG. 2E).

Figure 2F:
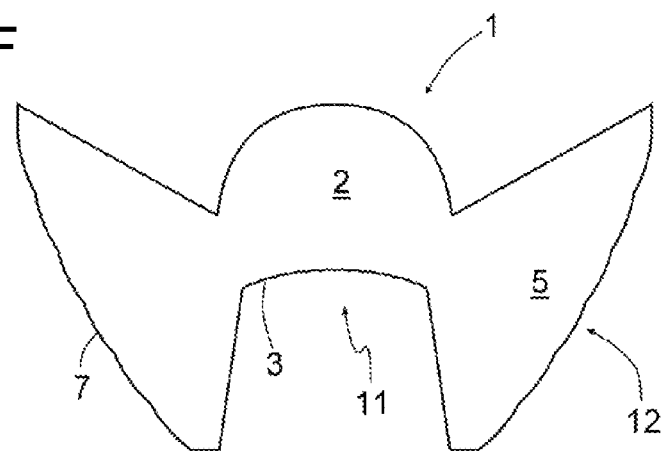

FIG. 2F shows a particularly preferred embodiment of the invention, in which the arrangements of concave micro lenses 11 and convex micro lenses 12 are mixed on different optical surfaces. In the exemplary embodiment illustrated, the concave micro lenses 11 are formed on a concave light entry surface 3 of the converging lens 2, while the TIR reflector surface 7 has convex micro lenses 12. The use of convex micro lenses 12 on the TIR reflector surface 7 does not generate any inhomogeneities in this exemplary application and is preferred here for reasons of greater ease of production of the tool.

Figure 3:
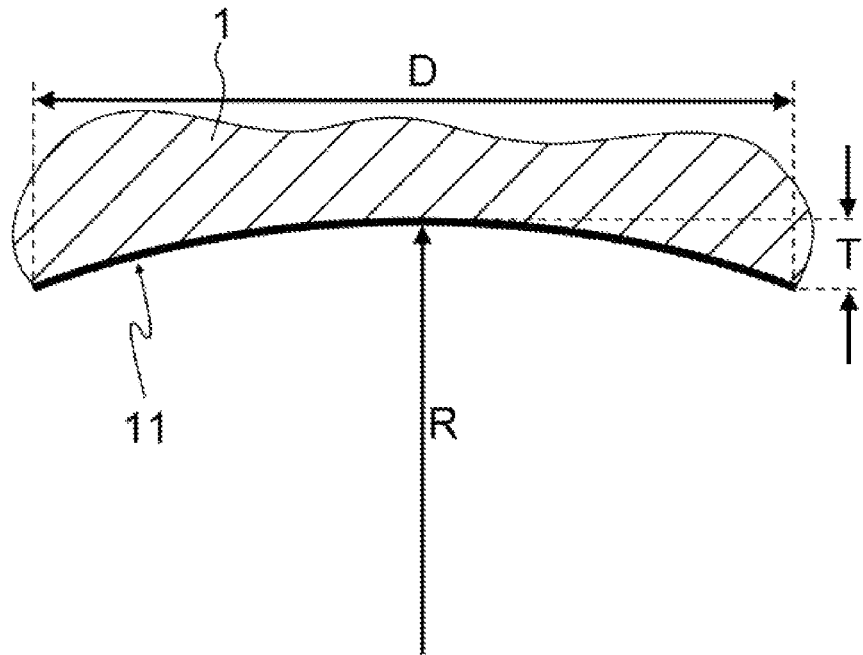
FIG. 3: the cross-section of a concave micro lens

FIG. 3 shows a portion of the cross-section of an individual concave micro lens 11, which is substantially partially circular in cross-section. The micro lens 11 illustrated possesses an average diameter D of 1 mm and a radius of curvature R of 4 mm. Furthermore, the micro lens has a depth T of 0.03 mm.

Figure 4A:
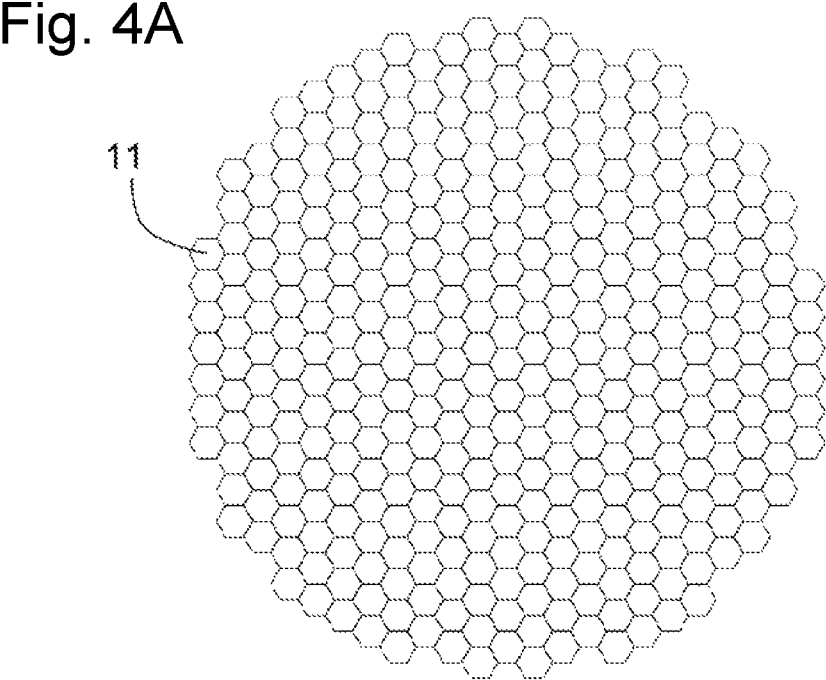
FIGS. 4A-4C: various distributions of the micro lenses.
Figure 4B:
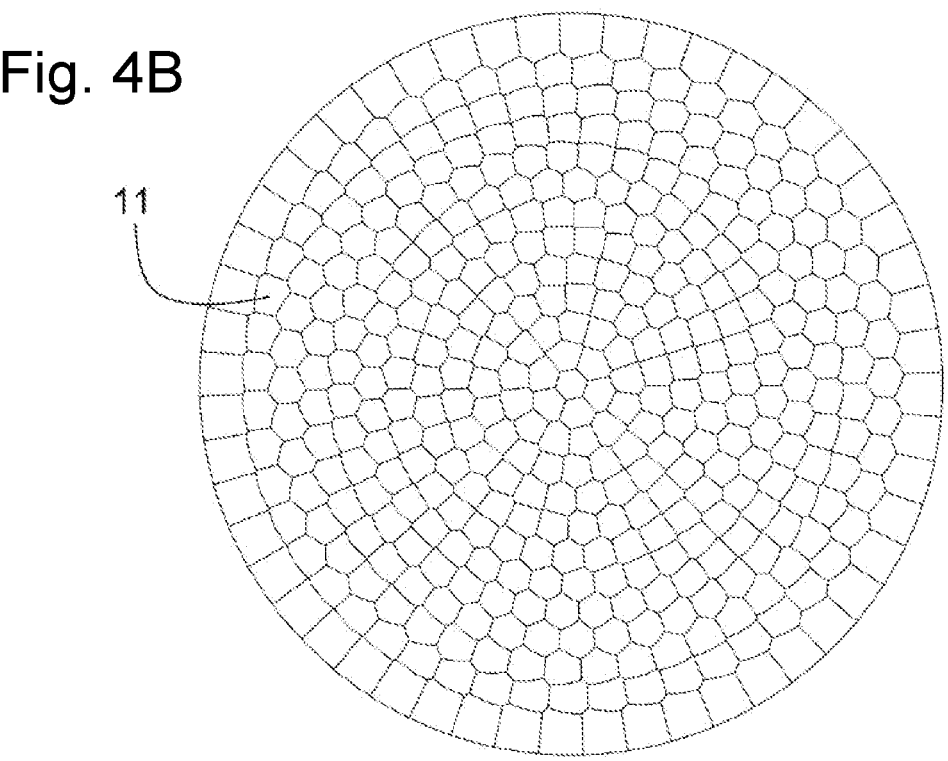
Figure 4C:
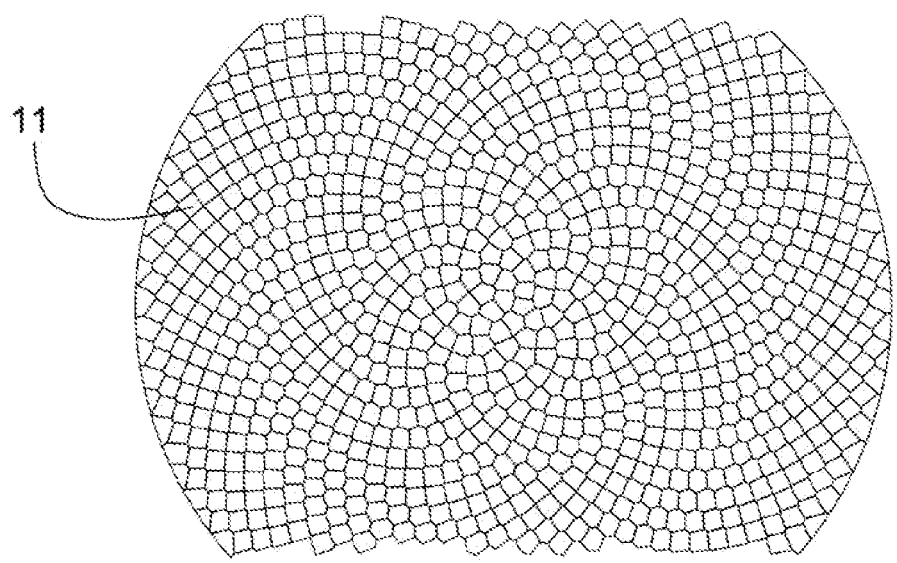

The micro lenses can be arranged uniformly or non-uniformly on the optical surface and with partial or total surface coverage FIGS. 4A-4C show preferred distributions of micro lenses of the same size, on average. Specifically, FIG. 4A shows a hexagonal distribution of micro lenses and FIG. 4B a distribution of micro lenses in concentric circles. FIG. 4C shows a phyllotactic distribution.

The invention claimed is:

1. A collimator for focusing light with a plurality of optical surfaces, which are designed as at least one of light entry surfaces, light exit surfaces, or reflection surfaces, each forming optical interfaces with a change in optical density, comprising a plurality of concave micro lenses formed on at least one of the light entry surfaces or the reflection surfaces, the collimator having a distribution of micro lenses with a variable optical design, in particular of micro lenses with one or more of: various radii of curvature, different average diameters, or aspherical micro lenses.

2. The collimator according to claim 1, characterized in that the collimator is formed as a TIR (Total Internal Reflection) collimator, with
   a converging lens, defining a rearward-facing light entry surface and a forward-facing light exit surface, and a reflector part, defining a light entry surface, a TIR reflector surface and a light exit surface, wherein the reflector part surrounds the converging lens in such a way that the TIR collimator defines a rearward-facing cavity, which is delimited by the light entry surface of the converging lens and the light entry surface of the reflector part.

3. The collimator according to claim 2, characterized in that the concave micro lenses are further formed on at least one of:
both the light entry surface of the converging lens and the TIR reflector surface
the light exit surface of the converging lens;
the light entry surface of the reflector part;
the light exit surface of the reflector part.

4. The collimator according to claim 3, characterized in that convex micro lenses are formed on at least one optical surface of the plurality of optical surfaces without concave micro lenses.

5. The collimator according to claim 4, characterized in that concave micro lenses are formed on the light entry surface of the converging lens and convex micro lenses are formed on the TIR reflector surface.

6. The collimator according to claim 3, characterized in that the concave micro lenses are substantially circular in form or have a polygonal boundary and defines an average diameter D of preferably 0.4 mm to 3 mm.

7. The collimator according to claim 6, characterized in that the concave micro lenses are spherical or aspherical in form, spherical micro lenses having a radius of curvature R of preferably 0.3 mm to 100 mm.

8. The collimator according to claim 7, characterized in that the concave micro lenses have a depth T of 0.05 mm to 1 mm.

9. The collimator according to claim 8, characterized by a uniform or non-uniform distribution of the concave micro lenses on the plurality of optical surfaces of the collimator.

10. The collimator according to claim 9, characterized by a distribution of micro lenses with a variable optical design, in particular of micro lenses with one or more of: various radii of curvature, different average diameters, or aspherical micro lenses.

11. A collimator for focusing light with a plurality of optical surfaces, which are designed as at least one of light entry surfaces, light exit surfaces, or reflection surfaces, each forming optical interfaces with a change in optical density, the collimator is formed as a TIR (Total Internal Reflection) collimator, comprising:
a converging lens, defining a rearward-facing light entry surface and a forward-facing light exit surface;
a reflector part, defining a light entry surface, a TIR reflector surface, and a light exit surface, wherein the reflector part surrounds the converging lens in such a way that the TIR collimator defines a rearward-facing cavity, which is delimited by the rearward-facing light entry surface of the converging lens and the light entry surface of the reflector part; and
a plurality of concave micro lenses, wherein the concave micro lenses are formed on at least one of the rearward-facing light entry surface of the converging lens, the light entry surface of the reflector part, or the TIR reflector surface.

12. The collimator according to claim 11, characterized in that the concave micro lenses are substantially circular in form or have a polygonal boundary and defines an average diameter D of preferably 0.4 mm to 3 mm.

13. The collimator according to claim 11, characterized in that the concave micro lenses are spherical or aspherical in form, spherical micro lenses having a radius of curvature R of preferably 0.3 mm to 100 mm.

14. The collimator according to claim 11, characterized in that the concave micro lenses have a depth T of 0.05 mm to 1 mm.

15. The collimator according to claim 11, characterized by a uniform or non-uniform distribution of the concave micro lenses on the plurality of optical surfaces of the collimator.

16. The collimator according to claim 11, characterized in that the concave micro lenses are further formed on at least one of:
the light exit surface of the converging lens; or
the light exit surface of the reflector part.

17. A collimator for focusing light with a plurality of optical surfaces, which are designed as at least one of light entry surfaces, light exit surfaces, or reflection surfaces, each forming optical interfaces with a change in optical density, wherein a plurality of concave micro lenses are formed on at least one of the plurality of optical surfaces, wherein the collimator is formed as a TIR (Total Internal Reflection) collimator, with a converging lens, defining a rearward-facing light entry surface and a forward-facing light exit surface, and
a reflector part, defining a light entry surface, a TIR reflector surface, and a light exit surface, wherein the reflector part surrounds the converging lens in such a way that the TIR collimator defines a rearward-facing cavity, which is delimited by the rearward-facing light entry surface of the converging lens and the light entry surface of the reflector part,
wherein the concave micro lenses are formed on at least one of: the rearward-facing light entry surface of the converging lens, the forward-facing light exit surface of the converging lens, the light entry surface of the reflector part, the TIR reflector surface of the reflector part, or the light exit surface of the reflector part,
wherein convex micro lenses are formed on at least one of the plurality of optical surfaces without concave micro lenses.

18. The collimator according to claim 17, characterized in that the concave micro lenses are substantially circular in form or have a polygonal boundary and defines an average diameter D of preferably 0.4 mm to 3 mm.

19. The collimator according to claim 17, characterized in that the concave micro lenses are spherical or aspherical in form, spherical micro lenses having a radius of curvature R of preferably 0.3 mm to 100 mm.

20. The collimator according to claim 17, characterized in that the concave micro lenses have a depth T of 0.05 mm to 1 mm.

21. The collimator according to claim 17, characterized by a uniform or non-uniform distribution of the concave micro lenses on the plurality of optical surfaces of the collimator.

* * * * *

UNITED STATES PATENT AND TRADEMARK OFFICE
CERTIFICATE OF CORRECTION

| | |
|---|---|
| PATENT NO. | : 11,835,731 B2 |
| APPLICATION NO. | : 17/260357 |
| DATED | : December 5, 2023 |
| INVENTOR(S) | : Dross |

It is certified that error appears in the above-identified patent and that said Letters Patent is hereby corrected as shown below:

In the Claims

Column 5,
Line 14, Claim 3, "part;" should read --part; or--.

Signed and Sealed this
Sixteenth Day of July, 2024

*Katherine Kelly Vidal*

Katherine Kelly Vidal
*Director of the United States Patent and Trademark Office*